(12) United States Patent
Kang et al.

(10) Patent No.: US 7,031,066 B2
(45) Date of Patent: Apr. 18, 2006

(54) INTEGRATOR OF OPTICAL DEVICE

(75) Inventors: Ho Joong Kang, Gyeonggi-do (KR);
Jong Myoung Park, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/878,122

(22) Filed: Jun. 29, 2004

(65) Prior Publication Data

US 2005/0024732 A1    Feb. 3, 2005

(30) Foreign Application Priority Data

Jun. 30, 2003    (KR) .................. 10-2003-0043787

(51) Int. Cl.
*G02B 27/10*    (2006.01)
*G02B 1/07*    (2006.01)

(52) U.S. Cl. .................. 359/627; 359/251; 359/485

(58) Field of Classification Search ................ 359/251, 359/487, 485, 253, 248, 237, 627, 618, 204
See application file for complete search history.

(56) References Cited

U.S. PATENT DOCUMENTS

| 4,974,919 | A | * | 12/1990 | Muraki et al. | .............. | 359/204 |
| 5,153,773 | A | * | 10/1992 | Muraki et al. | .............. | 359/619 |
| 2002/0036833 | A1 | * | 3/2002 | Miyata et al. | .............. | 359/651 |

FOREIGN PATENT DOCUMENTS

KR    10-2003-0004778 A    7/2001

* cited by examiner

*Primary Examiner*—Scott J. Sugarman
*Assistant Examiner*—M. Hasan
(74) *Attorney, Agent, or Firm*—Birch Stewart Kolasch & Birch LLP (57) ABSTRACT

An integrator of an optical device using a color drum is disclosed. The integrator includes an opening receiving a light generated from a lamp, an optical path part reflecting and passing forward the light received at the opening, a mirror part refracting and totally reflecting the light passed through the optical path part and changing a direction of the light being transmitted, a polarization plate transmitting light rays having a constant polarization direction, among the reflected light, and reflecting remaining light rays having other polarization directions, and a wave plate changing a phase of the light reflected from the polarization plate.

16 Claims, 9 Drawing Sheets

Acceptance : 30 degrees
Output Length : x̄ = 10.848 mm

TIR angle : Alpha' < 51 degree(SK5) , < 48.9 degree(BK7)

$$L' = \frac{X * \{\cot(\text{alpha}) - \tan(\text{alpha})\}}{1 + \tan(\text{alpha})}$$

FIG. 5B $$L = X * \tan(\text{alpha})$$

FIG. 5C

Case I

Upper light Ray: OK
: Beta=Alpha
Lower light Ray: OK
: Beta=Alpha

FIG. 5D

Case II

Upper light Ray: OK
: Beta=Alpha
Lower light Ray: OK
: Beta=Alpha

INTEGRATOR OF OPTICAL DEVICE

CROSS-REFERENCE TO RELATED APPLICATIONS

This application claims the benefit of Korean Application No. P2003-043787, filed on Jun. 30, 2003, which is hereby incorporated by reference as if fully set forth herein.

BACKGROUND OF THE INVENTION

1. Field of the Invention

The present invention relates to an optical device, and more particularly, to an integrator of an optical device. Although the present invention is suitable for a wide scope of applications, it is particularly suitable for enhancing the optical efficiency in the optical device using a color drum.

2. Discussion of the Related Art

Depending upon the number of image display devices used, an optical device can be categorized as a single-chip optical device, a two (2)-chip optical device, and a three (3)-chip optical device. Herein, the three (3)-chip optical device has a large number of optical assembly parts and includes an illuminating part as well as a relay part for compensating a difference in the optical path. Accordingly, the three (3)-chip optical device is disadvantageous in having a complicated structure and a large size.

Also, the light generated from a lamp of the three (3)-chip optical device lacks red light rays. Thus, since the color purity of the color red is low, a color gamut (i.e., the capacity of representing colors) becomes narrow. Moreover, since the three (3)-chip optical device uses a large number of image display device, the device cost increases and alignment problems of red, green, and blue panels occur.

Therefore, in order to resolve such problems of the three (3)-chip optical device, the two (2)-chip optical device or the single-chip optical device are more widely used in recent technology.

The two (2)-chip optical device and the single-chip optical device require a device for color scrolling, such as a color wheel, a color drum, a transmissive color drum, a color switch, and a rotating prism. Herein, the color drum is the most widely used scrolling device for its low cost and ability to easily form the optical device. Also, the color drum is advantageous in that, during a color scrolling process, a boundary surface of each color section of the color drum moves in a linear form.

However, in the optical device using the color drum, the shape of an integrator is limited due to the structural characteristic of the color drum. Herein, the integrator allows the light generated from the lamp to be spatially uniform and also changes the polarization direction of the generated light.

Unlike in the optical device using a color wheel, in the optical device using the color drum, the light generated from the lamp is passed (or transmitted) through the integrator at a direction forming a right angle (90°) with the direction of the light when received at the integrator, so as to reach the surface of the color drum.

Since the light outputted from the integrator is flown towards a color filter section of the color wheel, the integrator used in the color wheel optical device is not problematic. However, the light outputted from the integrator used in the color drum may not be accurately aligned with the color filter section of the color drum.

As described above, due to the structural limitations in the color drum and the integrator, the related art color drum optical device has the problem of a deficient optical efficiency.

SUMMARY OF THE INVENTION

Accordingly, the present invention is directed to an integrator of an optical device that substantially obviates one or more problems due to limitations and disadvantages of the related art.

An object of the present invention is to provide an integrator of an optical device that can enhance the optical efficiency in the optical device using a color drum.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an integrator of an optical device includes an opening receiving a light generated from a lamp, an optical path part reflecting and passing forward the light received at the opening, a mirror part refracting and totally reflecting the light passed through the optical path part and changing a direction of the light being transmitted, a polarization plate transmitting light rays having a constant polarization direction, among the reflected light, and reflecting remaining light rays having other polarization directions, and a wave plate changing a phase of the light reflected from the polarization plate.

Herein, a reflection surface is wrapped around the optical path part, so that an inside thereof becomes hollow or is formed of glass.

When the inside of the optical path part is hollow, the mirror part is fixed to the optical path part. And, when the inside of the optical path part is formed of glass, an air gap is formed between the optical path part and the mirror part.

Herein, the mirror part is formed of a prism. And, a shape of the mirror part is changed depending upon a light transmitting angle of the light.

A heterogenous medium is formed between the optical path part and the mirror part, so as to refract and totally reflect the light, when the optical path part and the mirror part are formed of an identical medium.

In another aspect of the present invention, an optical device includes a lamp generating light, an integrator including an optical path part passing on the light, and a mirror part refracting and totally reflecting the light and changing a transmission direction of the reflected light, a color drum filtering the light transmitted through the mirror part, a polarized beam splitter transmitting light rays having a constant polarization direction among the filtered light, and a liquid crystal on silicon panel displaying the light transmitted from the polarized beam splitter.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1A:
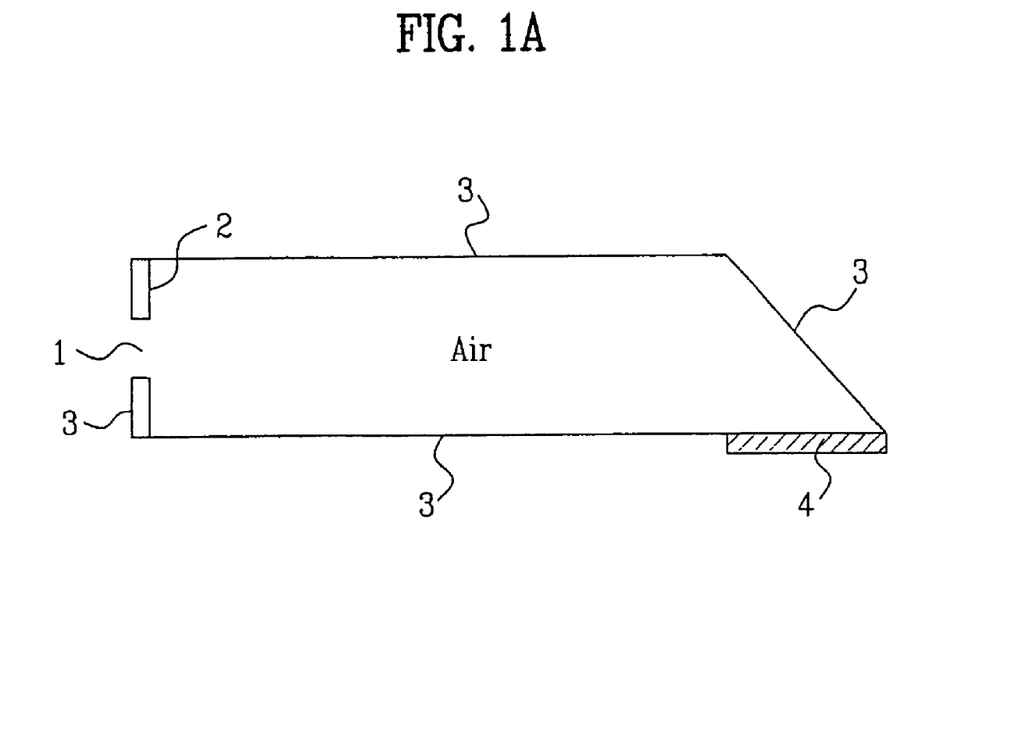
FIGS. 1A and 1B illustrate a general integrator used in a color drum.
Figure 1B:
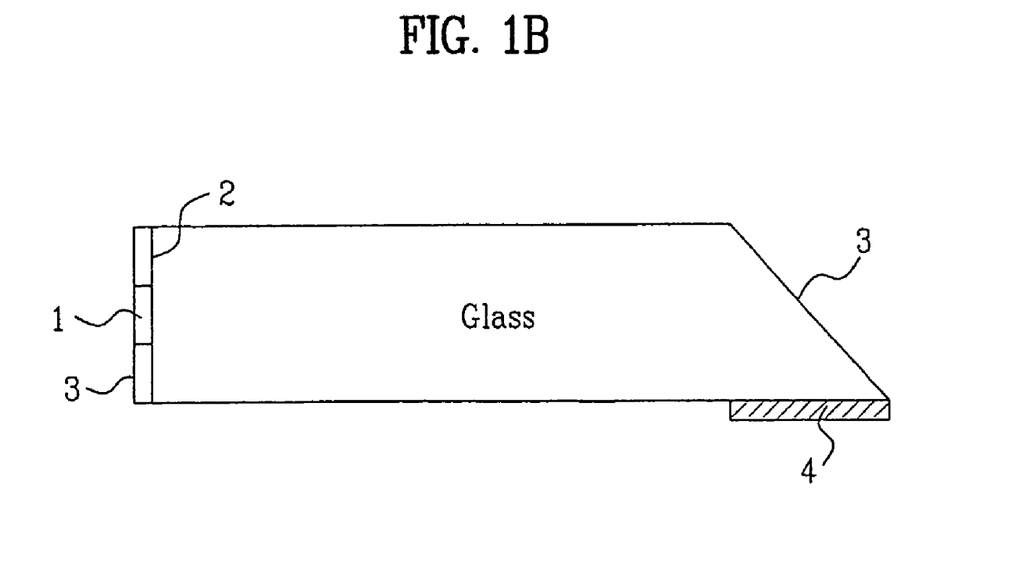

FIGS. 1A and 1B illustrate a general integrator used in a color drum.

Referring to FIGS. 1A and 1B, the integrator used in the two (2)-chip optical device or the single-chip optical device using the color drum can be categorized as a hollow type integrator having an empty interior, as shown in FIG. 1A, and a glass type integrator having the interior formed of glass, as shown in FIG. 1B.

The integrator includes an opening 1 for receiving light generated from a lamp, a reflection surface (or a total reflection surface) 3 allowing the generated light to become spatially uniform, a reflective polarization plate 4 equalizing a polarization direction of the light, a wave plate 2 changing a phase of the light reflected from the reflective polarization plate 4, and a recycling part formed of the reflection surface and the wave plate, the polarization changing efficiency.

Figure 2A:
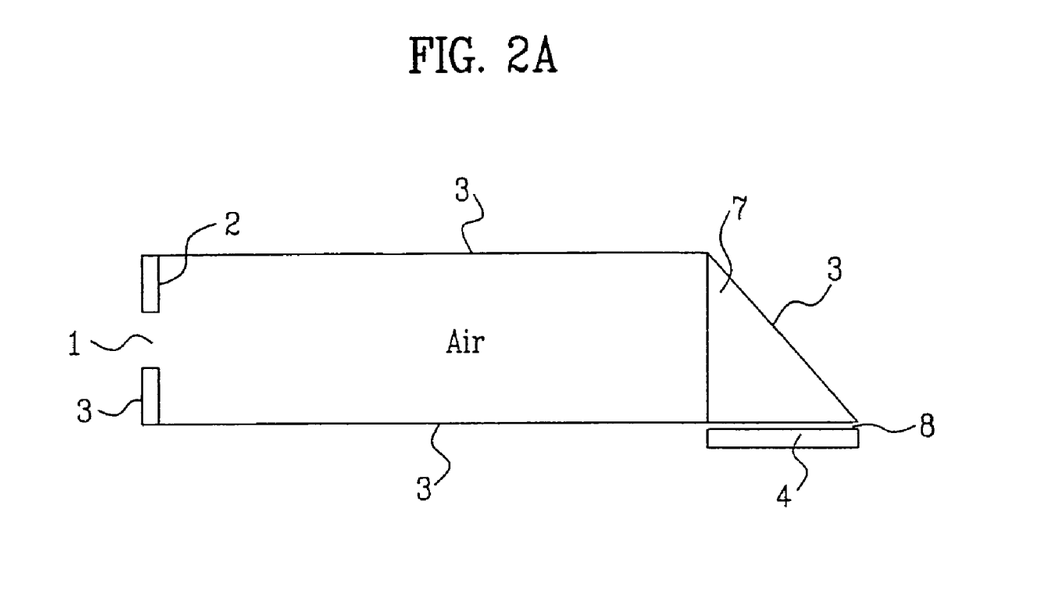
FIGS. 2A and 2B illustrate a structure of an integrator according to the present invention.
Figure 2B:
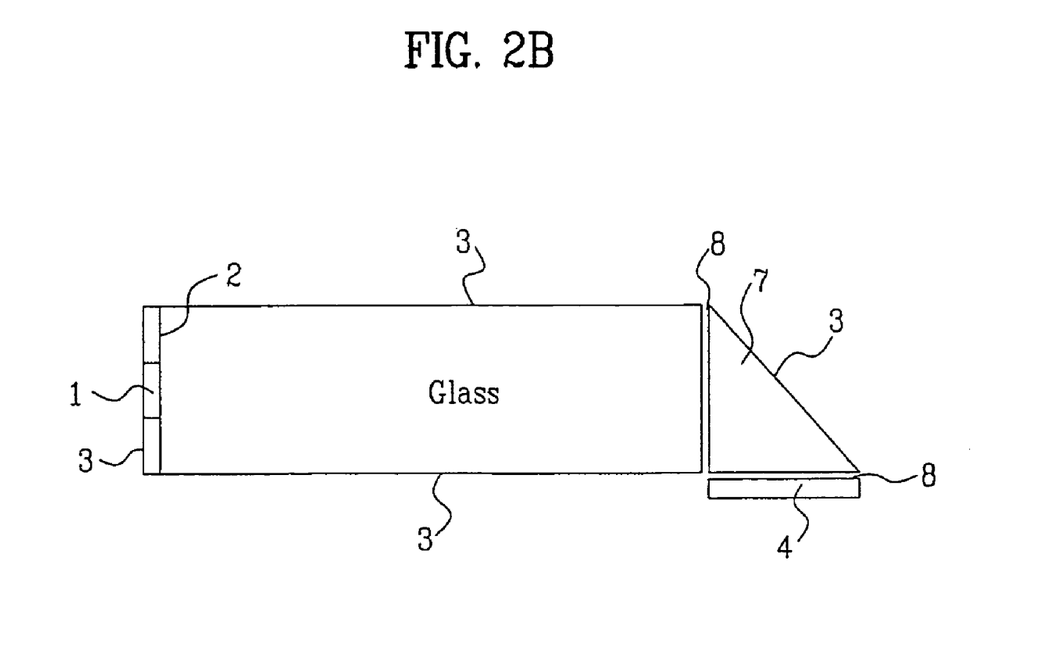

FIGS. 2A and 2B illustrate a structure of an integrator according to the present invention. More specifically, FIG. 2A illustrates a hollow type integrator according to the present invention having a prism fixed thereto, and FIG. 2B illustrates a glass type integrator according to the present invention having a prism fixed thereto.

Referring to FIG. 2A, the hollow type integrator according to the present invention includes an opening 1 for receiving light generated from a lamp, a reflection surface 3 for reflecting the received light, a prism 7 refracting and totally reflecting the reflected light, a reflective polarization plate 4 transmitting only the light rays polarized in a specific direction and reflecting the remaining light rays, among the light rays reflected from the prism, a wave plate 2 changing a phase of the light reflected from the reflective polarization plate 4, and an air gap 8 for refracting the light.

The glass type integrator according to the present invention, shown in FIG. 2B, has the same structure of the hollow type integrator, shown in FIG. 2A, except for that an air gap 8 is also formed between an optical path part and the prism in the glass type integrator.

The operating principles of the integrator according to the present invention will now be described in detail.

Figure 3A:
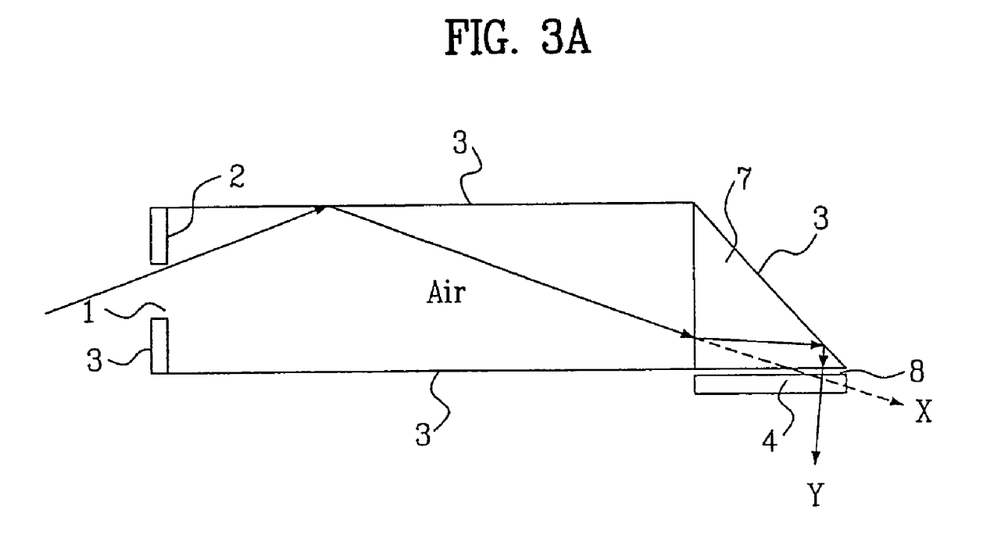
FIG. 3A illustrates an optical flow of a light ray in a hollow type integrator according to the present invention.

FIG. 3A illustrates an optical flow of a light ray in a hollow type integrator according to the present invention.

Referring to FIG. 3A, the light received at the opening 1 is passed through as the light is reflected from the reflection surface 3 placed on the optical path part of the integrator. Then, the reflected light passes through the optical path part, so as to be transmitted into the prism 7 formed of glass. Herein, due to the difference in refractive index between the optical path part and the prism, the light becomes refracted. Subsequently, the refracted light is totally reflected by the reflection surface 3 of the prism, and the light is then passed on towards the reflective polarization plate 4.

Among the light passed on to the reflective polarization plate 4, the S-wave light rays pass through the polarization plate, and the P-wave light rays are reflected. The phase of the reflected P-wave light rays is changed to S-wave light rays at the wave plate 2. Thus, the newly changed S-wave light rays can pass through the reflective polarization plate 4. In the optical device using the color drum, the light generated from the lamp is passed through the integrator at a direction forming a right angle (90°) with the direction of the light when received at the integrator, so as to reach the surface of the color drum.

Referring to FIG. 3A, the X-arrow, shown as dotted lines, represents the transmitted light transmitted from the related art integrator, and the Y-arrow, shown as a solid line, illustrates the transmitted light transmitted from the prism according to the present invention. Herein, the order of the S-wave and the P-wave can also be switched.

Figure 3B:
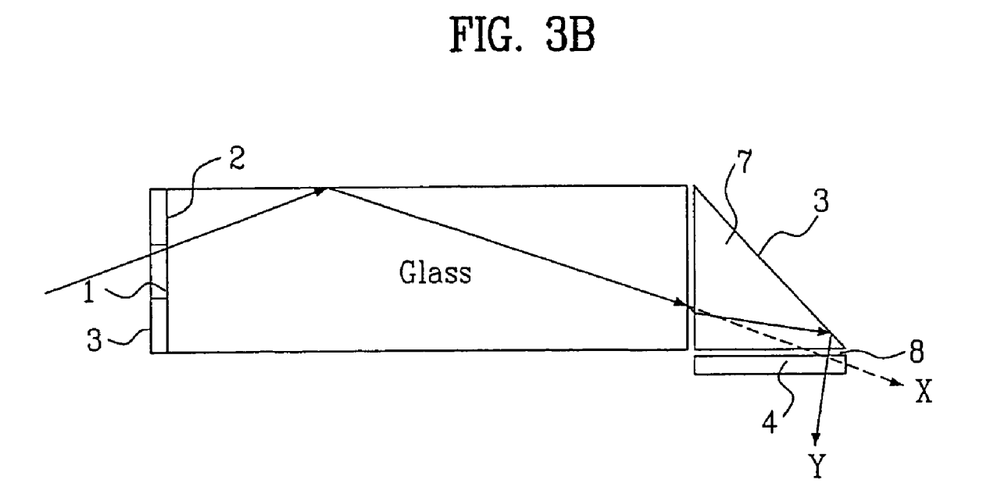
FIG. 3B illustrates an optical flow of a light ray in a glass type having an interior formed of glass according to the present invention.

FIG. 3B illustrates an optical flow of a light ray in an integrator having an interior formed of glass according to the present invention.

Referring to FIG. 3B, the light received at the opening 1 is passed through as the light is totally reflected due to a difference in the refractive index between the glass inside the integrator and the ambient air. Then, the totally reflected light is refracted by the air gap 8 and then transmitted into the prism 7. Subsequently, the light is reflected from the reflection surface 3 inside the prism 7 and then passed on towards the reflective polarization plate 4. Herein, as shown in FIG. 3B, since the inside of the integrator and the prism are both formed of glass, the air gap 8 should also be formed be formed between the optical path part and the prism, thereby causing a difference in the refractive index therebetween.

As shown in FIGS. 3A and 3B, there is a distinctive angular difference between the transmitted light of the related art integrator and the transmitted light of the integrator using the prism according to the present invention.

More specifically, in the related art integrator for a color drum, the light transmitted from the integrator is largely scattered to the left and right sides of the color filter section in the color drum. However, since the integrator according to the present invention uses the prism 7, the transmission angle of the light transmitted from the integrator is controlled, so that the transmitted light is aligned with the color filter section in the color drum, thereby compensating the amount of light reduced from the integrator.

Figure 4A:
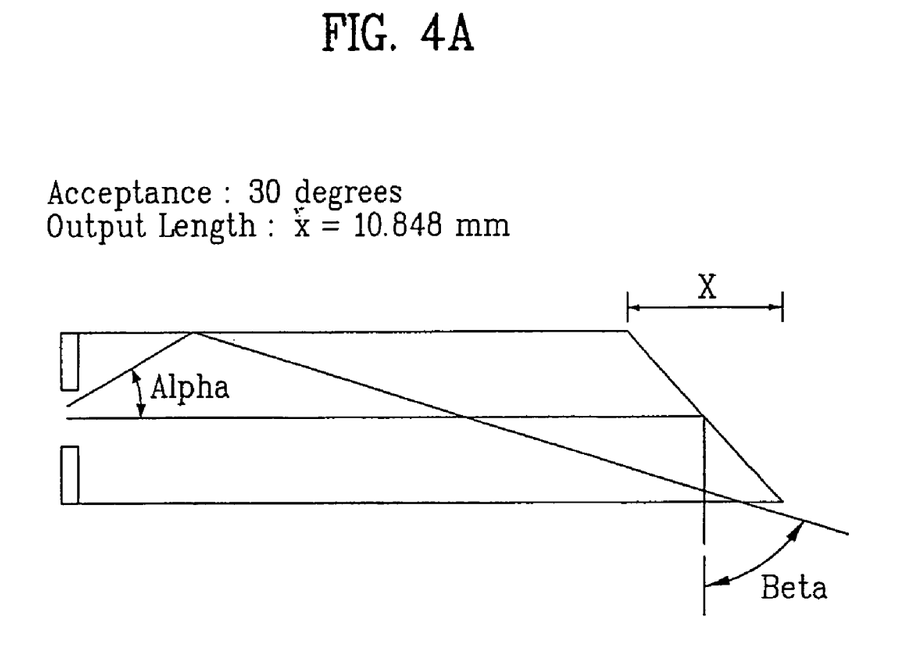
FIGS. 4A to 4C illustrate examples of a light receiving angle and a light transmitting angle of the integrator according to the present invention.
Figure 4B:
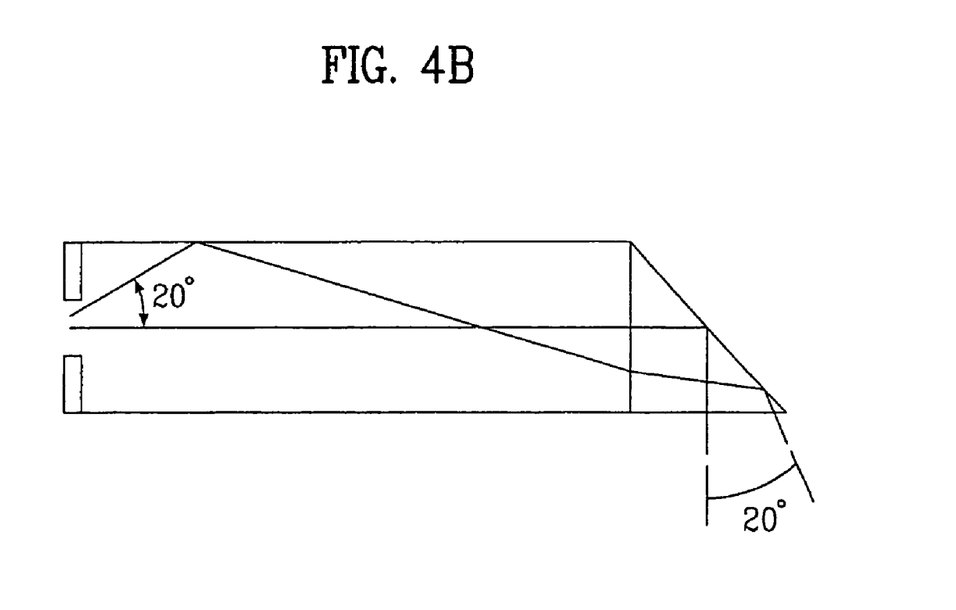
Figure 4C:
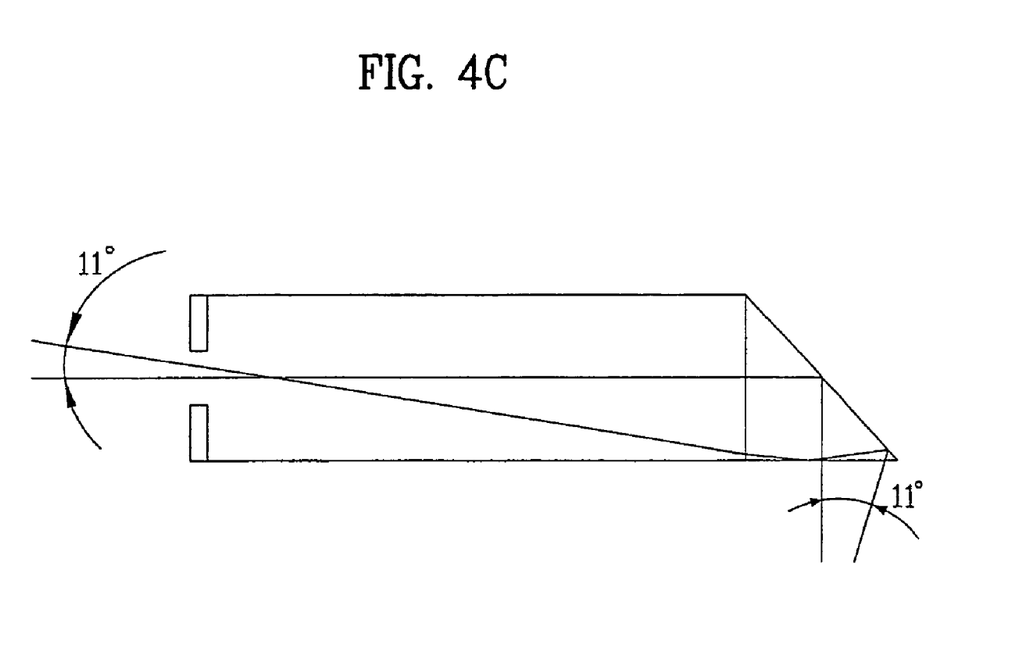

FIGS. 4A to 4C illustrate examples of a light receiving angle and a light transmitting angle of the integrator according to the present invention. Herein, the acceptance angle is 30°, and the length X of the prism of the prism is 10.848 millimeters (mm).

FIG. 4A defines the light receiving angle and the light transmitting angle of the light irradiated to and passed through the integrator. As shown in FIG. 4A, 'Alpha' represents the, light receiving angle, and 'Beta' represents the light transmitting angle.

FIGS. 4B and 4C illustrate the light receiving angle and the light transmitting angle of the integrator having a prism fixed thereto according to the present invention.

Referring to FIG. 4B, when using the prism, the light receiving angle Alpha is 20°, and the light transmitting angle Beta is 20°. Alternatively, as shown in FIG. 4C, when the light receiving angle Alpha is 11°, the light transmitting angle Beta is 11°. As described above, since the light receiving angle and the light transmitting angle are identical, the optical efficiency is enhanced.

Conversely, through an experiment using the related art integrator, it is shown that when the light receiving angle alpha is 20°, the light transmitting angle becomes 70°, and when the light receiving angle alpha is 11°, the light transmitting angle becomes 79°.

Also, the optical efficiency of the related art integrator is 55.78%, whereas the optical efficiency of the integrator according to the present invention is 75.75%.

FIGS. 5A to 5E illustrate analyses of an efficiency of the integrator according to the present invention.

Figure 5A:
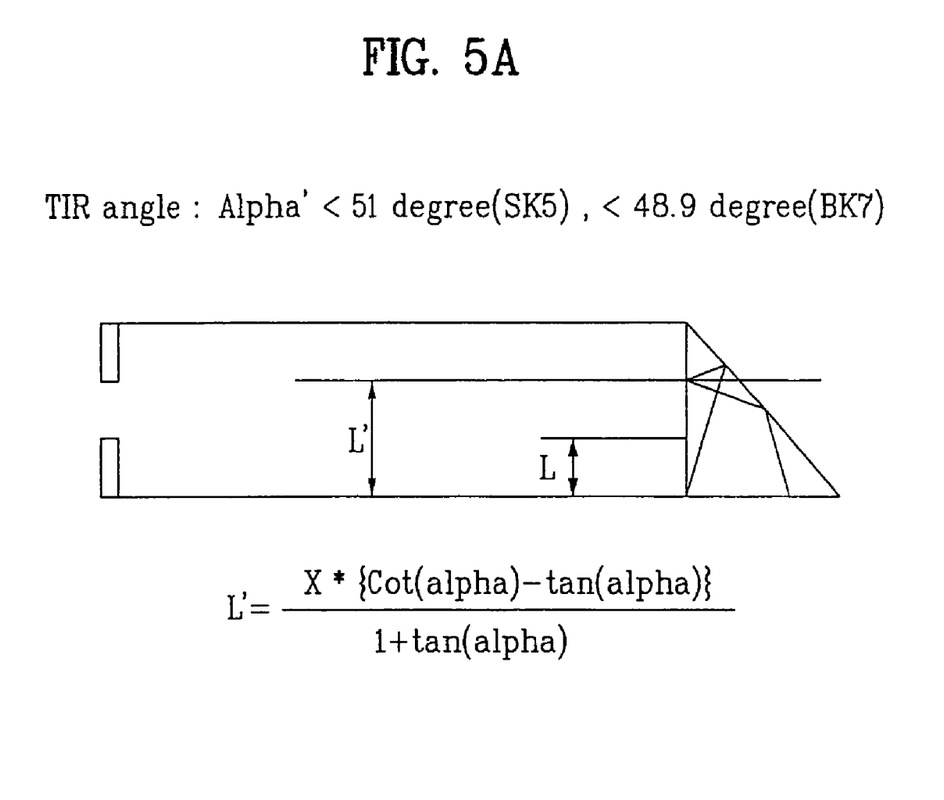
FIGS. 5A to 5E illustrate analyses of an efficiency of the integrator according to the present invention.

FIG. 5A illustrates a method for calculating L'. In the present invention, an SK5 optical glass having a total internal reflective (TIR) angle of less than 51° and a BK7 optical glass having a TIR angle of less than 48.9° is used. As shown in FIG. 5A, the L' value is the height of the light, among the totally reflected light rays from the inside of the reflection surface of the triangular prism, when the light is received by the reflection surface of the prism based on the light being passed on towards the lower left end surface of the reflection surface.

Therefore, L' can be represented by the following equation:

$$L' = \frac{X \times \{\cot(\text{alpha}) - \tan(\text{alpha})\}}{1 + \tan(\text{alpha})}$$

Figure 5B:
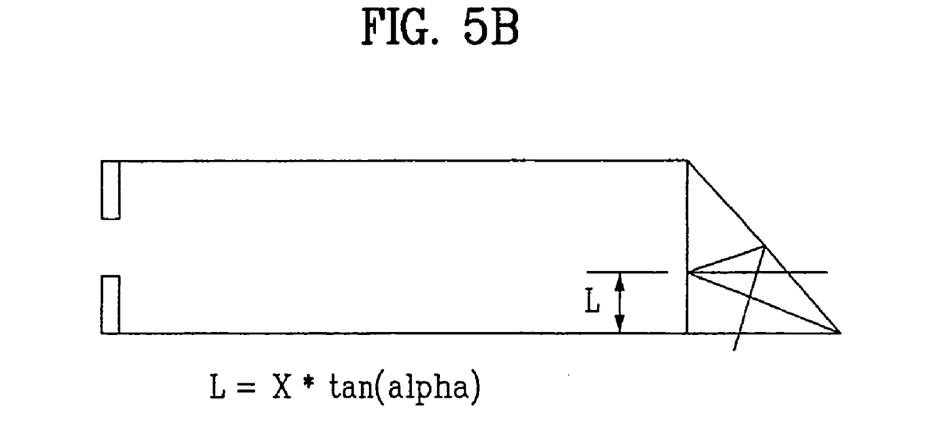

FIG. 5B illustrates a method for calculating L. As shown in FIG. 5B, the L value is the height of the light, among the totally reflected light rays from the inside of the reflection surface of the triangular prism, when the light is received by the reflection surface of the prism based on the light being passed on towards the lower right end surface of the reflection surface.

Therefore, L can be represented by the following equation:

$$L = X \times \tan(\text{alpha})$$

The L and L' values represent the reference heights of when optical loss occurs.

Figure 5C:
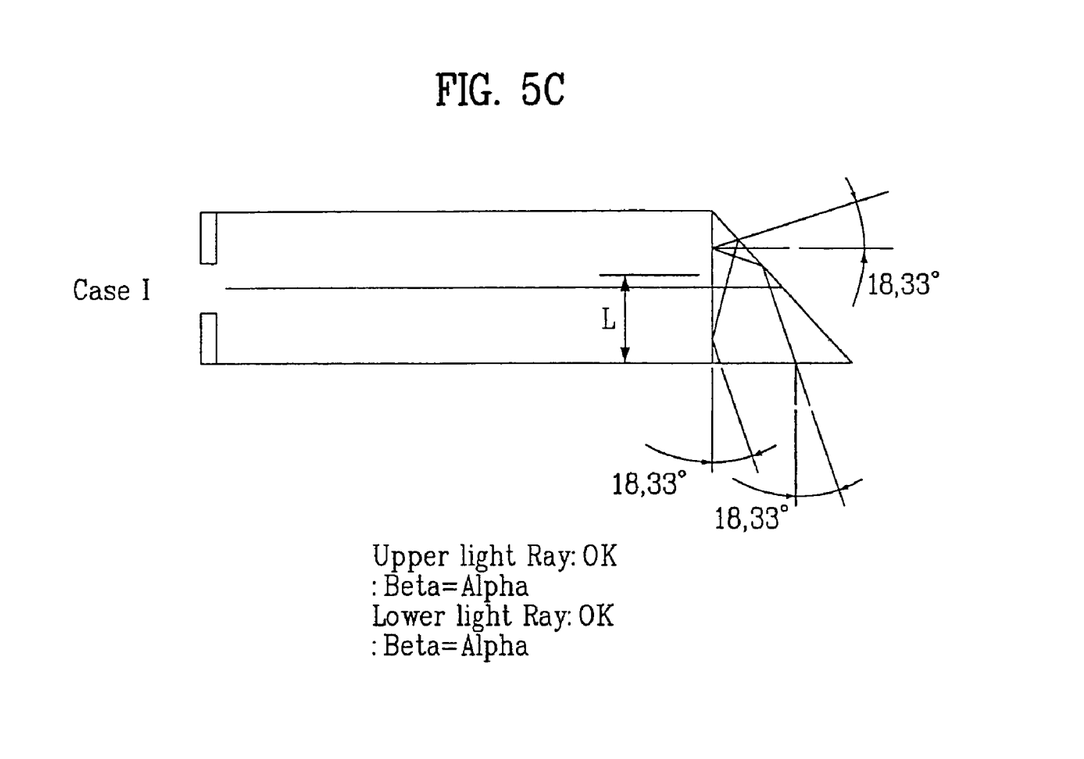

FIG. 5C illustrates an example of when the position of the reflection surface of the prism totally reflecting the light reflected from the inside of the integrator and passing the light forward, is placed at a position higher than L'. Herein, the upper light rays and the lower light rays are both adequately totally reflected from the inside of the prism. Thus, the light receiving angle and the light transmitting angle are equally 18.33°, and optical loss does not occur.

Figure 5D:
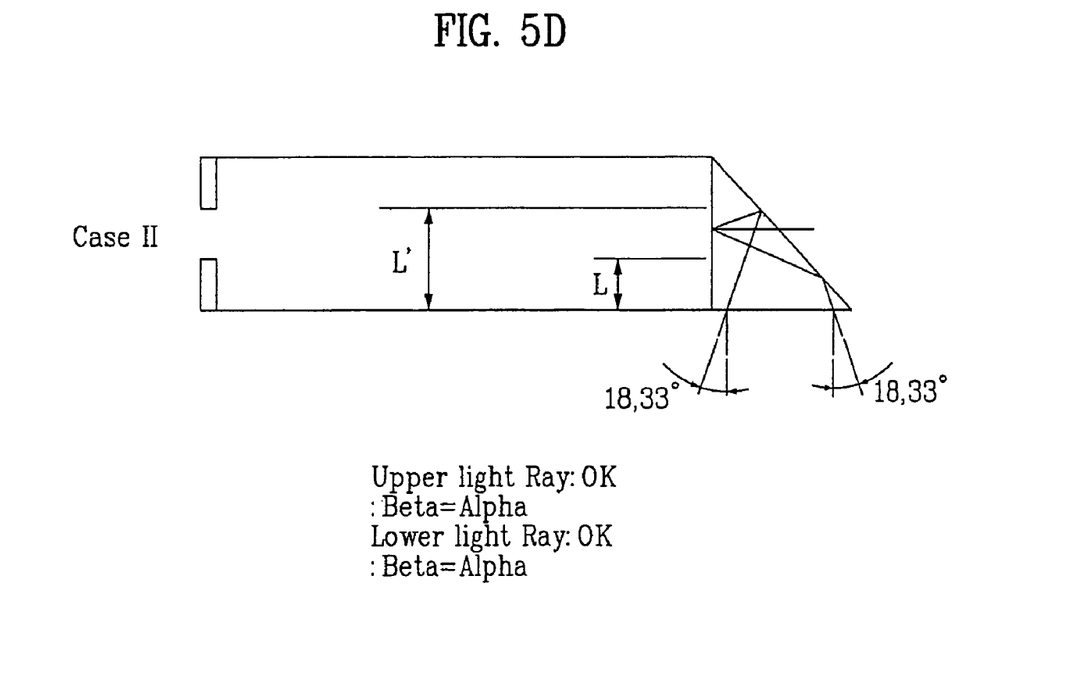

FIG. 5D illustrates an example of when the position of the reflection surface of the prism totally reflecting the light reflected from the inside of the integrator and passing the light forward, is placed at a position between L' and L. Similarly, the upper light rays and the lower light rays are both adequately totally reflected from the inside of the prism. Thus, the light receiving angle and the light transmitting angle are also equally 18.33°, and optical loss does not occur.

Figure 5E:
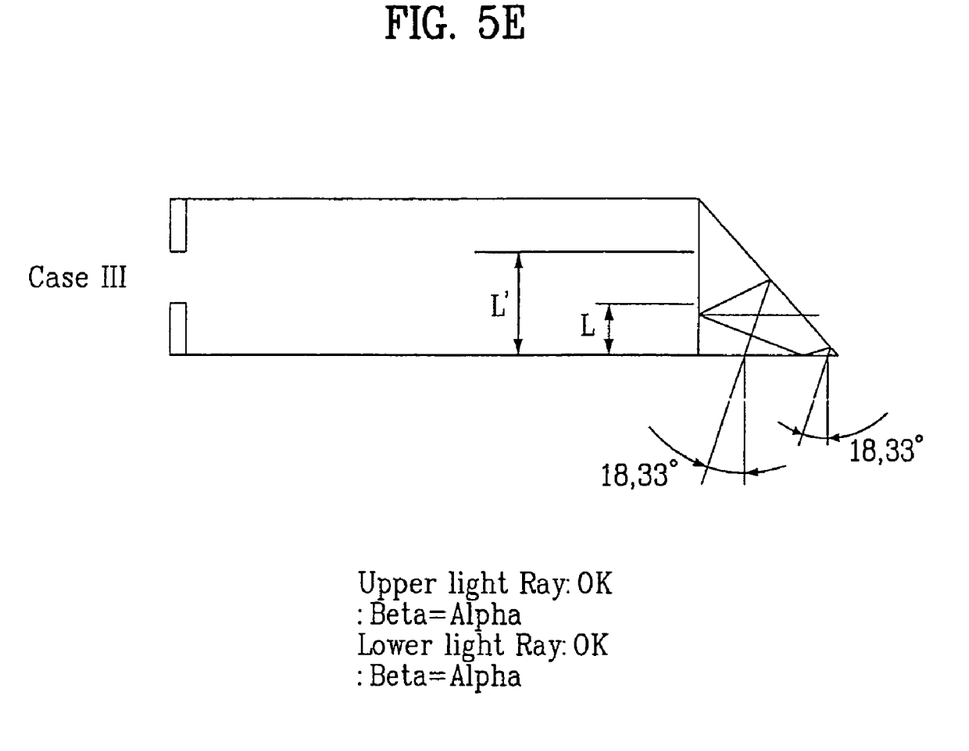

FIG. 5E illustrates an example of when the position of the reflection surface of the prism totally reflecting the light reflected from the inside of the integrator and passing the light forward, is placed at a position below L. Similarly, the upper light rays and the lower light rays are both adequately totally reflected from the inside of the prism. Thus, the light receiving angle and the light transmitting angle are equally 18.33°, and optical loss does not occur, just as shown in FIGS. 5C and 5D.

Therefore, by mounting a prism on a side whereby the light is transmitted from the integrator, the optical loss occurring in the related art integrator is eliminated.

Figure 6:
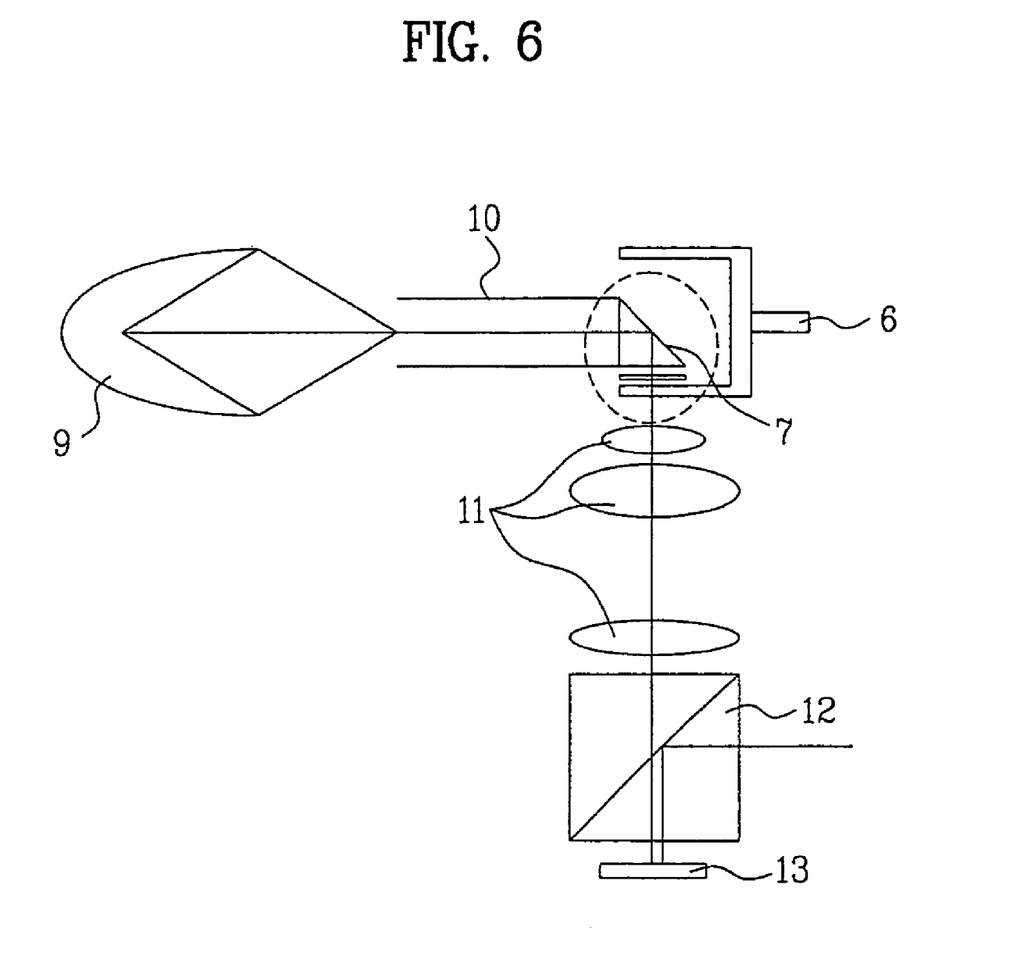
FIG. 6 illustrates a structure of an optical disc using the integrator according to the present invention.

FIG. 6 illustrates a structure of an optical disc using the integrator according to the present invention.

Referring to FIG. 6, the optical device includes a lamp 9 generating light, an integrator having a prism mounted thereon, a color drum 6 sequentially separating and transmitting light in the order of red, green, and blue light rays through a rotation of a motor, an illuminating lens 11 focusing the light transmitted through the color drum 6, a polarized beam splitter (PBS) 12 either transmitting or reflecting the light depending upon the polarization direction of the light, and a liquid crystal on silicon (LCoS) panel 13 displaying an image by reflecting the light transmitted through the polarized beam splitter 12 and passed on to the liquid crystal on silicon (LCoS) panel 13.

Herein, when the light generated from the lamp is received at the integrator, the received light becomes uniform, and the polarization direction of the light becomes constant. Also, as described above, by mounting the prism 7 on the integrator, the optical efficiency of the optical device is enhanced.

Accordingly, the above-described integrator of the optical device according to the present invention has the following advantages.

A prism is mounted on a light transmitting portion of the integrator according to the present invention in order to change the direction of the transmitted light, so that the transmitted light is aligned with the color filter section of the color drum, thereby compensating the optical loss occurred in the related art integrator.

Additionally, the structure of the optical device using the integrator according to the present invention is not largely modified, and so the optical efficiency can be enhanced without much fabrication cost.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An integrator of an optical device, comprising:
   an opening receiving a light generated from a lamp;
   an optical path part reflecting and passing forward the light received at the opening;

a mirror part refracting and totally reflecting the light passed through the optical path part and changing a direction of the light being transmitted;

a polarization plate transmitting light rays having a constant polarization direction, among the reflected light, and reflecting remaining light rays having other polarization directions; and a wave plate changing a phase of the light reflected from the polarization plate.

2. The integrator according to claim 1, wherein a reflection surface is wrapped around the optical path part, so that an inside thereof becomes hollow or is formed of glass.

3. The integrator according to claim 2, wherein the mirror part is fixed to the optical path part, when the inside of the optical path part is hollow.

4. The integrator according to claim 2, wherein an air gap is formed between the optical path part and the mirror part, when the inside of the optical path part is formed of glass.

5. The integrator according to claim 1, wherein the mirror part is formed of a prism.

6. The integrator according to claim 1, wherein a shape of the mirror part is changed depending upon a light transmitting angle of the light.

7. The integrator according to claim 1, wherein a heterogeneous medium is formed between the optical path part and the mirror part, so as to refract and totally reflect the light, when the optical path part and the mirror part are formed of an identical medium.

8. An optical device, comprising:

a lamp generating light;

an integrator including an optical path part passing on the light, and a mirror part refracting and totally reflecting the light and changing a transmission direction of the reflected light;

a color drum filtering the light transmitted through the mirror part;

a polarized beam splitter transmitting light rays having a constant polarization direction among the filtered light; and a liquid crystal on silicon panel displaying the light transmitted from the polarized beam splitter.

9. The device according to claim 8, wherein a reflection surface is wrapped around the optical path part, so that an inside thereof becomes hollow or is formed of glass.

10. The device according to claim 9, wherein the mirror part is fixed to the optical path part, when the inside of the optical path part is hollow.

11. The device according to claim 9, wherein an air gap is formed between the optical path part and the mirror part, when the inside of the optical path part is formed of glass.

12. The device according to claim 8, wherein the mirror part is formed of a prism.

13. The device according to claim 8, wherein a shape of the mirror part is changed depending upon a light transmitting angle of the light.

14. The device according to claim 8, wherein a heterogeneous medium is formed between the optical path part and the mirror part, so as to refract and totally reflect the light, when the optical path part and the mirror part are formed of an identical medium.

15. The device according to claim 8, wherein the polarization plate reflects remaining light rays having other polarization directions.

16. The device according to claim 15, further comprising a wave plate changing a phase of the light reflected from the polarization plate.

* * * * *